United States Patent Office 3,415,569
Patented Dec. 10, 1968

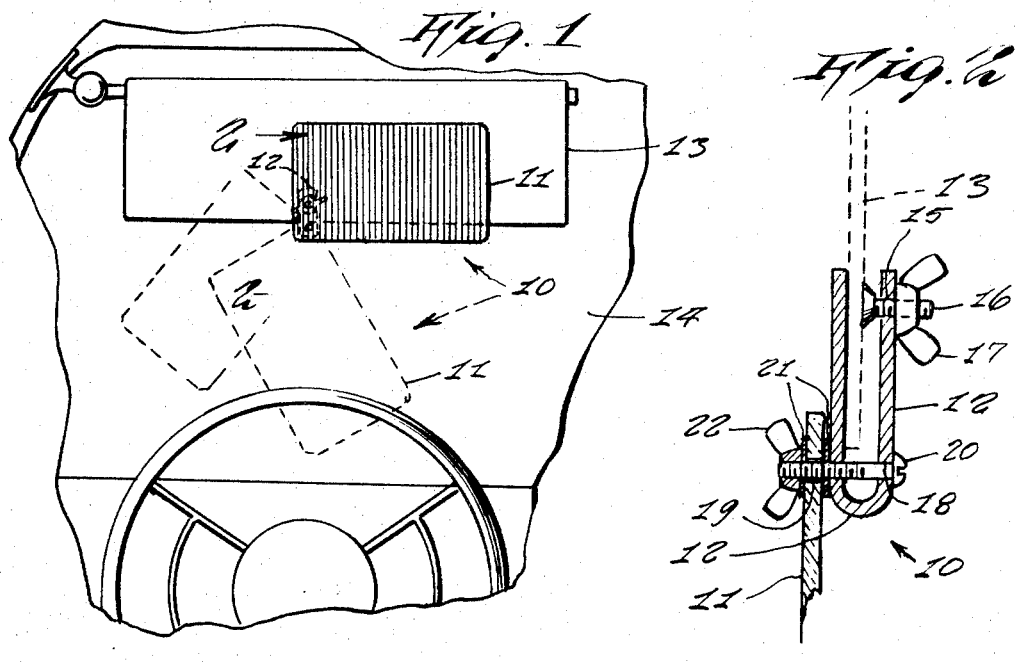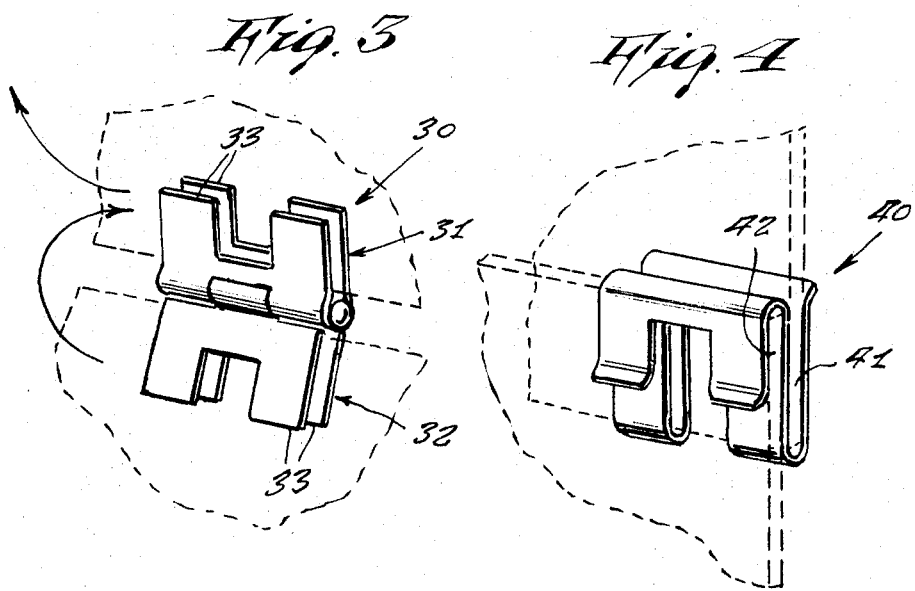
INVENTOR
VOLDEMAR LEEVO

3,415,569
SUN VISOR ATTACHMENT
Voldemar Leevo, 830 Cross St., Lakewood, N.J. 08701
Filed June 30, 1967, Ser. No. 650,327
1 Claim. (Cl. 296—97)

ABSTRACT OF THE DISCLOSURE

A sun shield for an automobile, including a shaded, translucent shield and a mounting bracket for securing the device to the conventional visor of the car, so as to permit a driver to look therethrough and prevent sun glare particularly during the hours of sunset and sunrise when the sun is low on the horizon. This sun-flex visor will prevent sun glare, including the glare on the shiny hood of a car or truck or airplane, by easily pulling the transparent plastic material to any angle it is desirable as there is no protection for eyes from present sun visor when the sun is low on the horizon.

---

This invention relates generally to sun visors. More specifically it relates to sun visors adapted particularly to automotive vehicles.

A principal object of the present invention is to provide a sun shield for an automobile for eliminating sun glare to the driver especially during time of sunset and sunrise when the sun is low on the horizon and the sun rays point directly into a driver's eyes. It is generally well known that under such conditions, it is difficult for a driver having only the conventional opaque sun visor equipment in his vehicle. He normally tries to see alongside an edge of the visor, however this method blocks completely that portion of the view occupied by the visor, and is thus somewhat dangerous. Additionally when the sun is dead ahead in line with the road, the present visor cannot solve the situation effectively at all, and the driver is unavoidably blinded, and in danger of leaving his lane of the road.

Accordingly, it is another object of the present invention to provide a sunflex visor through which a driver may see directly into the direction of the sun rays, thus not blocking his field of view with an opaque object.

Yet another object is to provide a sunflex visor which is readily attachable to the standard visor of the car.

Yet a further object is to provide a sunflex visor which will not in any way detract from the normal use of the standard visor.

Other objects are to provide a sunflex visor which is simple in design, inexpensive to manufacture, rugged in construction, easy to use and efficient in operation.

These and other objects will be readily evident upon a study of the following specification and the accompanying drawing wherein:

FIGURE 1 is a front elevation view of the invention shown mounted in a car,

FIGURE 2 is a cross sectional view taken on line 2—2 of FIGURE 1,

FIGURE 3 is a perspective view of a modified form of mounting bracket, and

FIGURE 4 is a similar view of yet another modified form of mounting bracket.

Referring now to the drawing in detail, reference numeral 10 represents a sunflex visor according to the present invention wherein there is a shield 11 and a bracket 12 for supporting the shield on a conventional visor 13 of a car 14.

The shield 11 comprises a rectangular plate of transparent plastic material, which is colored green, smoke, or other color that is restful to the eyes.

The bracket 12, shown in FIGURES 1 and 2, is of U-shaped configuration and has a threaded opening 15 to receive screw 16 having wingnut 17 for securement to the visor 13. Openings 18 and 19 in alignment receive screw 20 having washers 21 and wingnut 22 for securing the shield 11.

In FIGURE 3, a modified bracket 30 includes hinged leaves 31 and 32, each of which is U-shaped to form legs 33 between which the shield 11 and visor 13 may be clipped.

In FIGURE 4, a modified bracket 40 comprises a one piece member of S-configuration having pockets 41 and 42 within which the shield 11 and visor 13 may be clipped.

All brackets preferably should be of metal or possible fairly rigid plastic.

In operative use, the shield 11 may be moved in various positions as is indicated in FIGURE 1.

While various changes may be made in the detail construction, it is understood that such changes will be within the spirit and scope of the present invention.

Having thus set forth and disclosed the nature of this invention, what is claimed is:

1. In a sun visor attachment, the combination of a sun shield and a U-shaped bracket having spaced opposing legs adapted to receive therebetween a visor, said bracket having a threaded hole in one of said legs and a clamping screw mounted therein at the open end of said bracket for clamping the bracket to the visor, including a pair of aligned bores through the legs adjacent the closed end of the bracket and a long screw extending therethrough with a wing nut mounted on the screw spaced from the leg opposite the first said leg through which the said clamping screw is mounted, wherein said shield is eccentrically mounted on said long screw between the wing nut and the bracket, whereby the shield can be rotated about the long screw and affixed by the wing nut at desired positions relative to the axis of the long screw.

References Cited

UNITED STATES PATENTS

| | | |
|---|---|---|
| 1,725,340 | 8/1929 | Castriotis. |
| 2,261,881 | 11/1941 | Horstmann. |
| 2,458,125 | 1/1949 | Winkler. |

FOREIGN PATENTS

| | | |
|---|---|---|
| 338,361 | 6/1959 | Switzerland. |

BENJAMIN HERSH, *Primary Examiner.*

J. A. PEKAR, *Assistant Examiner.*